(12) United States Patent
Nitta et al.

(10) Patent No.: US 6,340,723 B1
(45) Date of Patent: Jan. 22, 2002

(54) HIGHLY ORIENTATED FLAKY PIGMENT AND A PROCESS FOR PRODUCING THE SAME

(75) Inventors: Katsuhisa Nitta; Bangyin Li, both of Iwaki (JP)

(73) Assignee: Merck Patent Gesellschaft mit beschraenkter Haftung (DE)

( * ) Notice: Subject to any disclaimer, the term of this patent is extended or adjusted under 35 U.S.C. 154(b) by 0 days.

(21) Appl. No.: 09/680,506

(22) Filed: Oct. 5, 2000

(30) Foreign Application Priority Data

Oct. 5, 1999 (JP) .......................... 11-283749

(51) Int. Cl.$^7$ .............................. C09C 1/02; C08K 3/18
(52) U.S. Cl. ................. 524/430; 524/442; 524/444; 524/445; 524/451; 106/450; 106/461; 106/462; 106/471; 523/171; 523/205; 523/209; 523/210; 523/216
(58) Field of Search ................. 160/450, 461, 160/462, 471; 524/430, 442, 444, 445, 431; 523/205, 209, 210, 216, 171

(56) References Cited

U.S. PATENT DOCUMENTS 5,827,906 A * 10/1998 Metzemacher et al. ..... 523/205
6,017,981 A * 1/2000 Hugo .......................... 523/216

* cited by examiner

Primary Examiner—Edward J. Cain
(74) Attorney, Agent, or Firm—Millen, White, Zelano & Branigan, P.C.

(57) ABSTRACT

The invention relates to a highly orientated flaky pigment being excellent in plane orientation (leafing effect), wherein a hydrated metal oxide and one or more fluorine-containing phosphates represented by the general formulae (A) and (B) shown in below or salts thereof are covered on the surface of a flaky pigment with a pearl gloss.

The general formulae:

(A) $(RfC_nH_{2n}O)_mPO(OM)_{3-m}$ (B) $(RfSO_2NRC_nH_{2n}O)mPO(OM)_{3-m}$ wherein Rf is the same or different and represents linear or branched $C_3$ to $C_{21}$ perfluoroalkyl group or perfluoroxyalkyl group, n is 1 to 12, m is 1 to 3, M represents hydrogen, alkali metal, ammonium group or substituted ammonium group, and R represents hydrogen or $C_1$ to $C_3$ alkyl group. A process for producing said pigment in a wet process is also disclosed.

6 Claims, No Drawings

HIGHLY ORIENTATED FLAKY PIGMENT AND A PROCESS FOR PRODUCING THE SAME

TECHNICAL FIELD OF INVENTION

The present invention relates to a highly orientated flaky pigment excellent in plane orientation (leafing effect). In particular, the present invention relates to a novel highly orientated flaky pigment excellent in plane orientation, which has been surface-treated with a fluorine-containing phosphate compound to improve the coloristic property and gloss of the flaky pearl pigment.

BACKGROUND ART

A flaky pigment with a pearl gloss (referred to hereinafter as "flaky pearl pigment") is a pigment prepared by coating on the surface of a flaky base material with a transparent or semitransparent metal oxide having high refractive index such as titanium dioxide, zirconium oxide and iron oxide, showing a pearl gloss resulted from mutual interfering action between reflection of incident light from a flaky substrate/coating layer interface and reflection of incident light from the surface of the coating layer, and this pigment is widely used in various fields such as paints, inks, plastics and cosmetics. As the flaky pearl pigment itself is composed of inorganic materials as described above, it has quite high polarity and high hydrophilicity. Therefore, its lipophilicity is poor, and its affinity to an organic medium is lower. Accordingly, due to its poor dispersibility, there appears problem that the flaky pearl pigment cannot be used independently. Hence, in order to improve their weather resistance and anti-yellowing property according to different uses, surface treated flaky pearl pigments with various methods have been proposed (e.g. for paints, JP-A 63-130673, JP-A 1-292067 etc.; for plastics, JP-A 4-296371, JP-A 5-171058, JP-A 9-48930 etc.).

However, the majority of these known techniques are concerned basically with treatment for the purpose of improving the affinity of the flaky pearl pigment to mediums, and offer only improvement in dispersibility (wettability) in a medium such as inks, paints and plastics, the orientation of the flaky pearl pigment readily becomes random in the medium, so the original characteristics resulting from the shape of the flaky pearl pigment cannot be sufficiently demonstrated. That is, there was the problem that it was impossible to arrange the flaky particle planes of the flaky pearl pigments to parallel to a printed surface or a coated surface (this arrangement is referred to hereinafter as "plane orientation") in order to achieve the adequate original effect of the pigment on chroma and gloss. The probability of attaining plane orientation can be increased to a certain degree by improving or devising the method of printing or painting, but it is still insufficient to achieve the adequate effect. Accordingly, there is a great demand in the market for demonstration of the characteristics originated from the shape of the flaky pearl pigment (the improvement in coloristic property etc. by plane orientation is also referred hereinafter to as leafing effect). The technical problem with this demand is that it is necessary for the flaky pearl pigment to maintain suitable affinity to prevent mutually aggregation of powdered particles in a medium constituting an ink, paint, plastic etc., and also simultaneously to float the pigment powdered particles on the surface of the medium without dispersing them into the inside of the medium, therefore the delicate balance is required for setting up this condition.

On the other hand, phosphates having perfluoroalkyl groups (referred to hereinafter as fluorine-containing phosphate compounds) have been proposed as a treating agent for powder to render hydrophobicity and oleophobicity on cosmetics (JP-A 5-39209, JP-A 5-124932, JP-A 9-30935 etc.), but they are not aimed directly at the leafing effect for the purpose of improving the characteristics of the flaky pigment. Furthermore, these prior art techniques make use of a method (a) where the fluorine-containing phosphate compound is dry-mixed directly with powder or a method (b) where the fluorine-containing phosphate compound is previously dissolved in a soluble solvent, and the resulting solution is dry-mixed with powder and dried, and therefore, these methods are aimed at mere physical adsorption but not at chemical adsorption, resulting in weak binding and inadequate duration and stability of the effect. In fact, there appears the problem that when such fluorine-containing ester compounds are added to inks, paints, plastics etc., their effect is not satisfactory, and the characteristics of the pigment at the initial stage are lowered through the operation of mixing with other medium components. Further, there existed another problem that because uniform adsorption is difficult in the dry mixing process, a long time is necessary for mixing and stirring, resulting in destruction of flaky base materials.

DISCLOSURE OF THE INVENTION

As a result of their eager investigation to improve the characteristics of the flaky pearl pigment, the present inventors found that upon treating the flaky pigment with a hydrated metal oxide and then surface-treating it with a fluorine-containing phosphate compound, the flaky pearl pigment is endowed with excellent plane orientation to exhibit an excellent leafing effect as a pigment for inks, paints, plastics or cosmetics. On the basis of this finding, the present invention was made.

That is, the present invention provides the novel highly orientated flaky pigment, the process for producing the same and the ink, paints, plastics and cosmetics comprising said pigment.

1. A highly orientated flaky pigment being excellent in plane orientation, characterized in that a hydrated metal oxide and one or more phosphates selected from phosphates having perfluoroalkyl groups represented by the general formulae (A) and (B) shown below or salts thereof are coated one after another on the surface of a flaky pigment with a pearl gloss. The general formulae:
   (A) $(RfC_nH_{2n}O)_mPO(OM)_{3-m}$
   (B) $(RfSO_2NRC_nH_{2n}O)_mPO(OM)_{3-m}$
   wherein Rf is the same or different and represents linear or branched $C_3$ to $C_{21}$ perfluoroalkyl group or perfluoroxyalkyl group, n is 1 to 12, m is 1 to 3, M represents hydrogen, alkali metal, ammonium group or substituted ammonium group, and R represents hydrogen or $C_1$ to $C_3$ alkyl group.

2. The highly orientated flaky pigment according to item 1 above, characterized in that the metal component in the hydrated metal oxide comprises one or more metals selected from aluminium, zinc, calcium, magnesium, zirconium and cerium, and the amount thereof in terms of metal oxide is 0.1 to 20% by weight relative to the flaky pearl pigment.

3. The highly orientated flaky pigment according to item 1 or 2 above, characterized in that the amount of the phosphates having perfluoroalkyl groups represented by the general formula (A) or (B) shown above or salts thereof is 0.1 to 20% by weight relative to the flaky pearl pigment.

4. A highly orientated flaky pigment characterized in that the highly orientated flaky pigment according to any one of item 1 to 3 is surface-treated further with a polymer selected from cellulose compounds and poly (meth)acrylate compounds.

5. A process for producing a highly orientated flaky pigment, characterized in that a flaky pigment is suspended in water, the pH of the suspension is adjusted to no less than the neutralization hydrolysis point of a metal salt, then an aqueous solution of one or more metal salts selected from aluminium, zinc, calcium, magnesium, zirconium and cerium is added to the suspension while keeping its pH constant with an aqueous alkali solution, and after addition, its pH is adjusted to no more than the pH at the neutralization hydrolysis point of the metals, an aqueous solution of phosphates having perfluoroalkyl groups represented by the general formula (A) or (B) shown in above or salts thereof is added to the resulting suspension under stirring, and after the addition, its suspension is filtered, washed with water and dried.

6. Inks, paints, plastics or cosmetics containing the highly orientated flaky pigment according to any one of items 1 to 4 above.

Hereinafter, the present invention is described in more detail.

The flaky pearl pigment used as the starting material in the present invention is not particularly limited, and usually its size is 500 μm or less in average, preferably 200 μm or less in average, and its thickness is preferably 2 μm or less in average, more preferably 1 μm or less in average, and for example, it is possible to use a pearl pigment obtained in a known coating method of a flaky base material such as natural mica, synthetic mica, graphite, alumina flake, silica flake, bismuth oxychloride or glass flake, with a transparent or semitransparent metal oxide having high refractive index. Specifically, the flaky pearl pigment can be obtained by coating the base material with a highly transparent or semitransparent metal oxide having high refractive index, such as titanium dioxide, iron oxide and zirconium oxide alone or in a mixture system or in the form of separate layers. As the process for producing the flaky pearl pigment, there is a method of coating the surface of a flaky base material in a suspension of the flaky base material with a hydrolyzate, by neutralization hydrolysis or heating hydrolysis, of a metal salt solution, followed by drying and calcining it, or a method of coating such metal alcoholate by a sol-gel method. Further, in the present invention, in the case of a flaky substrate of low polarity such as graphite, a flaky pearl pigment coated with a metal oxide after surface oxidation treatment (JP-A 4-320460, JP-A 4-348170 etc.), or a weather resistance pigment prepared by weather resistance-treating a flaky pearl pigment with Ce, Zr etc. (JP-A 1-292067 etc.) can also be used. The highly orientated flaky pigment of the present invention whose color tone (hue, chroma, luster) is based on the tone of the known flaky pearl pigment described in above, has further effectively improved said base color tone.

The flaky pigments being excellent in plane orientation according to the present invention have a variety of the above-described known flaky pearl pigments coated with specific hydrated metal oxides. The "hydrated metal oxides" referred to in the present invention are those obtained by hydrolyzing metal salts, and for example, include metal hydroxides, hydrated oxides or mixtures thereof. Said hydrated metal oxides are presumed to act as a binder between the flaky pearl pigment as the starting material and a phosphate having perfluoroalkyl groups or a salt thereof (fluorine-containing phosphate compound) and also have the secondary effect of weather resistance. That is, the material forming the hydrated metal oxide is selected from metal species considered to form insoluble metal salt bonds with the fluorine-containing phosphate compounds represented by the general formula (A) or (B). The metal species constituting this hydrated metal oxide include metals such as aluminium, zinc, calcium, magnesium, zirconium and cerium or mixtures thereof. Among these metal species, aluminium, zinc, calcium and magnesium are preferably used. For the purpose of additionally improving weather resistance, metal species such as zirconium and cerium are particularly preferable. These hydrated metal oxides can be coated on the flaky pearl pigment by subjecting aqueous solutions of their corresponding metal salts such as chlorides, sulfates, nitrates, halides and oxy halides as the starting materials to alkali hydrolysis.

The amount of the metal salt forming the hydrated metal oxide used in the present invention suffices when it can form a monolayer of the hydrated metal oxide on the surface of the flaky pearl pigment. Accordingly, if the specific surface area of the flaky pearl pigment is large, a large amount of the metal salt is necessary, whereas for a small specific surface area, a small amount suffices. Further, a large amount of the metal salt is unpreferable because this causes the change of in the color tone (hue, chroma, luster) of the flaky pearl pigment and further agglomeration of pigment particles occurs easily. Usually, the amount of the metal salt can be varied depending on the specific surface area of the flaky pearl pigment, and this amount can be determined preferably in the range of 0.1 to 20% by weight relative to the flaky pearl pigment. For example, when mica titanium (referring herein to a pigment having flaky mica covered with titanium dioxide) with an average particle size of about 12 μm is used, an amount of 10% by weight or less, preferably an amount of 5% by weight or less, is recommended.

It can be considered that the hydrated metal oxide coated in this manner on the flaky pearl pigment is then exposed to pH lower than the neutralization hydrolysis point of the metal salt whereby in the reaction shown in the formulae a) to c), a hydroxy group binding to the metal on the surface is converted into a water molecule, and as a result, various metal cations such as hydroxy metal cations, oxymetal cations, hydrated metal cations are formed, and the fluorine-containing phosphate compound to be later on this site forms an insoluble metal salt bond and adsorbed thereon.

M: n-valence metal a) $M(OH)_n + H^+ \rightarrow [M(OH)_{n-1}]^+ + H_2O$ (hydroxy metal cation)

b) 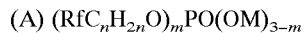 or (hydroxy metal cation) $[O=M(OH)_{n-4}]^{2+}+H_2O$ (oxymetal cation)

c) 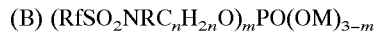 or $[MH_2=)]^{n+}$ (metal cation) (hydrated metal cation)

The fluorine-containing phosphate compound used in the present invention is a phosphate selected from phosphates having perfluoroalkyl groups represented by the general formulae (A) and (B) below or a salt thereof.

The general formulae:

(A) $(RfC_nH_{2n}O)_mPO(OM)_{3-m}$ (B) $(RfSO_2NRC_nH_{2n}O)_mPO(OM)_{3-m}$ wherein Rf is the same or different and represents a linear or branched $C_3$ to $C_{21}$ perfluoroalkyl group or perfluoroxyalkyl group, n is 1 to 12, m is 1 to 3, M represents hydrogen, alkali metal, ammonium group or substituted ammonium group, and R represents hydrogen or $C_1$ to $C_3$ alkyl group.

Typical examples thereof include diheptadecafluorodecyl phosphoric acid $[(C_8F_{17}C_2H_4O)_2PO(OH)]$, heptadecafluorodecyl phosphoric acid [$(C_8F_{17}C_2H_4O)PO(OH)_2$], a mixture thereof, bis[2-(N-propyl-N-perfluoro-octane sulfonamide)ethyl] phosphoric acid [$(C_8F_{17}SO_2N(C_3H_7)C_2H_4O)_2PO(OH)$], alkali metal salts thereof, ammonium salts, and substituted ammonium salts (here, substituted ammonium salts mean alkanol amines such as monoethanol amine and diethanol amine as well as basic amino acids). In these salts, alkali metal salts, ammonium salts, monoethanol amine salts and diethanol amine salts are suitable at the point of water solubility, and in particular alkaline metal salts are preferable. If these salts are commercially available in the form of aqueous solutions, these can be used directly.

The fluorine-containing phosphate compounds such as UNIDAN TG101 (Daikin Industries, Ltd.), ZONYL-UR, ZONYL-FSP, ZONYL-FSE (DuPont), FTOP EF-123A, EF-123B (TOHKEM Products Co., Ltd.), MEGAFAC F-191 (Dainippon Ink and Chemicals, Inc.), SURFLON S-12 (Asahi Glass Co., Ltd.) are commercially available. The amount of the fluorine-containing phosphate compound used is varied depending on the specific surface area of the flaky pearl pigment as the starting material, and its amount is in the range of 0.1 to 20% by weight, preferably 0.5 to 10% by weight, and more preferably 1 to 5% by weight. Its amount is selected such that a monolayer adsorption layer is formed at least on the surface. If this amount is too low, the so-called leafing effect cannot be obtained sufficiently. Whereas, if the amount is too large, double or more layers are formed and the desired leafing effect is lowered and further there is no economical benefit.

FT-IR analysis of the binding state of the fluorine-containing phosphate compound in the highly orientated flaky pigment of the present invention reveals the disappearance of a broad and strong absorption (wavelength of 2700 to 2500 $cm^{-1}$ and 2300 to 2100 $cm^{-1}$) corresponding to —P—O . . . H, and TG/DTA analysis indicates that the pyrolysis temperature of the fluorine-containing phosphate compound is shifted to higher temperatures, and from these analysis results it is estimated that the fluorine-containing phosphate compound is adsorbed not via physical adsorption but via chemical bonding.

The highly orientated flaky pigment of the present invention may additionally be treated with various polymers depending on its use. This treatment is conducted in conformity to a different medium for each use in inks, paints, plastics and cosmetics to further improve the leafing effect. The polymers used here include e.g. celluloses such as cellulose nitrate, alkyl cellulose, hydroxy cellulose, hydroxyalkyl cellulose, carboxymethyl cellulose, and cellulose acetobutyrate, or poly(meth)acrylate and salts thereof, copolymers between maleic anhydride and various alkenes and salts thereof, for example, alkali hydrolysates of maleic anhydride-styrene copolymers and alkali hydrolysates of maleic anhydride-isobutylene. For use in plastics, plasticizers such as DOP (dioctyl phthalate) etc. can be used in this process alone or in combination with polymers.

Now, the process for producing the highly orientated flaky pigment according to the present invention is described.

First, an aqueous suspension of the flaky pearl pigment is prepared, and the pH of the suspension is adjusted using an acidic aqueous solution or an alkaline aqueous solution to a predetermined pH value of no less than the neutralization point of a metal salt (a salt of aluminium, calcium, zinc, magnesium, zirconium, or cerium, or a mixture of these salts). The pH value for this hydrolysis is varied depending on the type of a metal salt used in the present invention, and a pH value higher than the neutralization point pH is adopted. To the suspension under stirring is added a separately prepared solution of the salt, during which the pH in the suspension is kept constant. After a predetermined amount of the salt is added, an acidic solution is used to lower the pH by about 0.2–3.0 from the hydrolysis neutralization point. It is presumed that by this pH adjustment, the above-described various metal cations are formed on the surface of the pigment. If this reduction in pH is 0.2 or less, the degree of formation of cations is reduced, and the described highly orientated flaky pigment is hardly obtained.

On the other hand, if this reduction in pH is larger than 3.0, the hydrated metal oxide once coated is significantly eluted so the desired flaky pigment excellent in high orientation is hardly obtained in this case too. For example, if the aluminium salt (neutralization point is 5.2) is used, its hydrolysis is conducted at pH 5.8 to precipitate hydrated aluminium oxide, and then pH is reduced to 4.8 (the reduction range in pH from the neutralization point is 0.4). In the case of the magnesium salt (neutralization point is 12.4), its hydrolysis is conducted at pH 12.5, and the pH is lowered to e.g. 10.2 (the reduction range in pH from the neutralization point is 2.2) to form cations. In the case of the zinc salt (neutralization point is 8.0), its hydrolysis is conducted at pH 8.0 and the pH is lowered to e.g. 6.5 (the reduction range in pH from the neutralization point is 1.5). If the neutralization point pH is high, the pH can be greatly reduced in the range of 0.2 to 3.0.

On one hand, the fluorine-containing phosphate compound is used after its aqueous solution is adjusted to predetermined pH and concentration. If the starting material is solids, its aqueous solution at a predetermined concentration is separately prepared after its pH is increased to no less than the water-solubility pH using an alkali solution. The aqueous solution thus obtained is added to the suspension of the flaky pearl pigment after pH adjustment. After addition, the pH of the suspension is further lowered (optionally) depending on the case. This is conducted in the direction of decreasing pH for the properties of the fluorine-containing phosphate, thereby strengthening metal bonds between the fluorine-containing phosphate compound and a metal cation on the surface of the coated hydrated metal oxide.

Because the method of permitting the fluorine-containing phosphate compound to be adhered in a wet system (suspension) to the surface of the flaky pearl pigment coated with the hydrated metal oxide is adopted, the fluorine-containing phosphate compound can be allowed to adhere more uniformly to the surface than by the conventional dry-mixing process.

Then, after the solution of the fluorine-containing phosphate compound was dropped, solids in the suspension are separated by filtration, and water-soluble materials adhering to the filtered cake are washed away with water and subjected to the drying step, thereby giving the highly orientated flaky pigment of the present invention. The drying temperature in this drying step is adapted to a water-evaporating temperature which is lower than the decomposition temperature of the fluorine-containing phosphate compound, and a temperature of 110 to 150° C. is usually suitable in consideration of the drying rate.

In the surface treatment with a polymer in the present invention, a usual dry-mixing process may be adopted. A device for dry mixing unit includes e.g. Henschel mixer, Waring blender, Super mixer, impeller mixer etc. Further, a spray-mixing method can also be adopted. In the surface treatment of the polymer used in the present invention, the polymer is previously dissolved in soluble solvents and if possible in highly evaporable solvents, for example water, ethanol, isopropyl alcohol, ethyl acetate, methanol, toluene, cyclohexanone etc. and these may be dry-mixed or sprayed. In this stage, a plasticizer can also be used in combination particularly for use in plastics.

The highly orientated flaky pigment of the present invention obtained in this manner can sufficiently demonstrate the leafing effect as the main object of the present invention upon incorporation into inks, paints, plastics or cosmetics, and in these mediums, formation of aggregates is not observed. Accordingly, the highly orientated flaky pigment of the present invention can be used effectively in inks for printing such as gravure printing, padding, offset printing etc., in various industrial paints, automobile paints, for printing and painting on the surface of paper and plastics, or mixed in plastics for improvement of coloration, or by virtue of its high orientation characteristics, it can also be used in a semitransparent reflection plate and a diffusion sheet in a liquid crystal display.

Hereinafter, the present invention is further described in more detail by reference to the Examples and Comparative Examples, which however are not intended to limit the present invention.

The entire disclosure of all applications, patents and publications, cited above and below, and of corresponding Japanese Patent Application No. 11-283 749, filed Oct. 5, 1999 is hereby incorporated by reference.

EXAMPLES

In the foregoing and in the following examples, all temperatures are set forth uncorrected in degrees Celsius; and, unless otherwise indicated, all parts and percentages are by weight.

Example 1

100 g flaky pearl pigment (Iriodin® 223 with an average particle diameter of 12 μm, Merck) was suspended in 2.01 water and heated to about 75° C. under stirring. The pH value of the suspension was adjusted to 5.8 with 20 weight-% aqueous hyrochloric acid solution. Then, 130 g aqueous aluminium chloride solution (concentration: 5.6% by weight) was dropped to it while the pH was kept at 5.8 with 32 weight-% aqueous sodium hydroxide solution. After dropping, the pH was decreased to 4.8 with an aqueous hydrochloric acid solution and the mixture was stirred for 30 minutes. Separately, 100 g water was added to a diethanolamine salt (10 g of 15 weight-% active ingredients in water) of a mixture of diheptadecafluorodecyl phosphoric acid $[(C_8F_{17}C_2H_4O)_2PO(OH)]$ and heptadecafluorodecyl phosphoric acid $[(C_8F_{17}C_2H_4O)PO(OH)_2]$ and then adjusted to pH 8 with 32 weight-% aqueous sodium hydroxide solution. To this aqueous solution thus obtained was dropped to the above suspension while the suspension was kept at pH 4.8 with 20 weight-% aqueous hydrochloric acid solution. After dropping, the pH value was further decreased to 4 with 20 weight-% aqueous hydrochloric acid solution, and solids were separated by filtration from the resulting suspension, then washed and dried at 130° C. for 12 hours, to give the highly orientated flaky pigment. Measurement of this product by TG/DTA indicated that the amount of the fluorine-containing phosphate compound coated on the flaky pearl pigment was 1.5% by weight of the pigment, and it was calculated that 99% by weight of the charged fluorine-containing phosphate compound was coated on said pigment.

Example 2

100 g of the highly orientated flaky pigment obtained in Example 1 was further dry-mixed with 5 g cellulose nitrate solution (concentration: 20% by weight) in a Waring blender by dropping said cellulose nitrate solution and then dried to give the highly orientated flaky pigment treated with the cellulose.

Example 3

100 g flaky pearl pigment (Iriodin® 223 with an average particle diameter of 12 μm, Merck) was suspended in 2.01 water and heated to about 75° C. under stirring. The pH value of the suspension was adjusted to 8.0 with 32 weight-% aqueous sodium hydroxide solution. Then, 46 g aqueous zinc chloride solution (concentration: 4% by weight) was dropped to it while the pH was kept at 8.0 with 32 weight-% aqueous sodium hydroxide solution. After dropping, the pH was decreased to 6.5 with 20 weight-% aqueous hydrochloric acid solution and the mixture was stirred for 30 minutes.

Separately, 100 g water was added to a diethanolamine salt (10 g of 15 weight-% active ingredients in water) of a mixture of diheptadecafluoro-decyl phosphoric acid $[(C_8F_{17}C_2H_4O)_2PO(OH)]$ and heptadecafluorodecyl phosphoric acid $[(C_8F_{17}C_2H_4O)PO(OH)_2]$ and then adjusted to pH 8 with 32 weight-% aqueous sodium hydroxide solution.

This aqueous solution was dropped to the above suspension while it was kept at pH 6.5 with 20 weight-% aqueous hydrochloric acid solution. After dropping, the pH value was further decreased to 4 with 20 weight-% aqueous hydrochloric acid solution, and solids were separated by filtration from the resulting suspension, then washed and dried at 130° C. for 12 hours, to give the highly orientated flaky pigment. Measurement of this product by TG/DTA indicated that the amount of the fluorine-containing phosphate compound coated on the flaky pearl pigment was 1.4% by weight of the pigment, and it was calculated that 94% by weight of the charged fluorine-containing phosphate compound was coated on said pigment.

Example 4

100 g of the highly orientated flaky pigment obtained in Example 3 was further dry-mixed with 5 g cellulose nitrate solution (concentration: 20% by weight) in a Waring blender by dropping said cellulose nitrate solution and then dried to give the highly orientated flaky pigment treated with the cellulose.

Example 5

100 g flaky pearl pigment (Iriodin® 223 with an average particle diameter of 12 μm, Merck) was suspended in 2.01 water and heated to about 75° C. under stirring. The pH value of the suspension was adjusted to 5.8 with 20 weight-% aqueous hydrochloric acid solution. Then, 130 g aqueous aluminium chloride solution (concentration: 5.6% by weight) was dropped to it while the pH was kept at 8.0 with 32 weight-% aqueous sodium hydroxide solution. After dropping, the pH was decreased to 4.8 with 20 weight-% aqueous hydrochloric acid solution and the mixture was stirred for 30 minutes.

Separately, 300 g water was added to 3 g of bis[2-(N-propyl-N-perfluorooctane sulfonamide)ethyl] phosphoric acid $[(C_8F_{17}SO_2N(C_3F_7)(C_2H_4O)_2PO(OH)]$ and then adjusted to pH 8 to prepare an aqueous solution. This aqueous solution was dropped to the above suspension while it was kept at pH 4.8 with 20 weight-% aqueous hydrochloric acid solution. After dropping, the pH value was further decreased to 4 with 20 weight-% aqueous hydrochloric acid solution, and solids were separated by filtration from the resulting suspension, then washed and dried at 130° C. for 12 hours, to give the highly orientated flaky pigment. Measurement of this product by TG/DTA indicated that the amount of the phosphoric acid bis(2-(N-propylperfluorooctanesulfonyl-amine)ethyl) ester coated on the flaky pearl pigment was 3.0% by weight of the pigment, and it was calculated that 99% by weight of the charged ester was coated on said pigment.

Example 6

100 g of the highly orientated flaky pigment obtained in Example 5 was further dry-mixed with 5 g polyacrylate sodium salt solution (concentration: 20% by weight) in a Waring blender by dropping said sodium salt solution and then dried to give the highly orientated flaky pigment treated with the poly acrylate.

COMPARATIVE EXAMPLES

Comparative Example 1

130 g aqueous aluminium chloride solution (concentration: 5.6% by weight) was dropped to a suspension of the flaky pearl pigment in Example 1 while it was kept at pH 5.8 with 32 weight-% aqueous sodium hydroxide solution, and then the fluorine-containing phosphate compound shown in Example 1 was added thereto with the pH kept at the same value of 5.8, and the other conditions were the same as in Example 1, to give a highly orientate flaky pigment. Measurement of this product by TG/DTA indicated that the amount of the fluorine-containing phosphate compound coated on the flaky pearl pigment was 1.2% by weight of the pigment, and it was calculated that 81% by weight of the charged fluorine-containing phosphate compound was coated on said pigment, and this amount was lower than the coated amount on the highly orientated flaky pigment in Example 1.

Comparative Example 2

46 g aqueous zinc chloride solution (concentration: 4% by weight) was dropped to a suspension of the flaky pearl pigment in Example 3 while it was kept at pH 8.0 with 32 weight-% aqueous sodium hydroxide solution, and then the fluorine-containing phosphate compound shown in Example 3 was added thereto with the pH kept at the same value of 8.0, and the other conditions were the same as shown in Example 3, to give a highly orientated flaky pigment. Measurement of this product by TG/DTA indicated that the amount of the fluorine-containing phosphate compound coated on the flaky pearl pigment was 0.5% by weight of the pigment, and it was calculated that 34% by weight of the charged fluorine-containing phosphate compound was coated on said pigment, and this amount was lower than the coated amount on the flaky pigment in Example 3.

Comparative Example 3

A highly orientated flaky pigment was prepared under the same conditions in Example 1 except that the suspension of the flaky pearl pigment in Example 1 was adjusted to pH 5.8 and the aqueous solution of aluminium chloride was not used. Measurement of the product by TG/DTA indicated that the amount of the fluorine-containing phosphate compound coated on the flaky pearl pigment was 0.9% by weight of the pigment, and it was calculated that 58% by weight of the charged fluorine-containing phosphate compound was coated on said pigment, and this amount was lower than the coated amount on the highly orientated flaky pigment in Example 1.

EVALUATION TEST

Evaluation of Orientation

The technical problem solved by the present invention is to maintain a certain degree of affinity to a medium used in the flaky pigment without forming any aggregates in the medium and to permit the pigment to float on the surface of the medium with the pigment being parallel to the liquid surface. Accordingly, a simple evaluation test (float test) was conducted to examine whether the pigment floated on the surface of water and toluene solvent without forming any aggregates, and further a printing test was conducted after a gravure ink was prepared as a sample.

1. Float test

Method: About 20 ml water or toluene was introduced into a test tube, and about 0.2 g test sample was added thereto, and the test tube was shaken up and down by hand and then allowed to stand, and the state of formation of aggregates on the liquid surface, and the state of float thereof, were visually observed. The state of float (including formation of aggregates) was evaluated in the following 3 ranks.

TABLE 1

| | Float test | | | |
| --- | --- | --- | --- | --- |
| | State of float | | Formation of aggregates | |
| Sample | water | toluene | water | toluene |
| Example 1 | 3 | 3 | none | none |
| Example 2 | 3 | 3 | none | none |
| Example 3 | 3 | 3 | none | none |
| Example 4 | 3 | 3 | none | none |
| Example 5 | 3 | 3 | none | none |
| Example 6 | 3 | 3 | none | none |
| Comparative Example 1 | 3 | 2 | none | present |
| Comparative Example 2 | 3 | 2 | none | present |
| Comparative Example 3 | 3 | 2 | none | present |
| Ir. 223* | 1 | 1 | none | present |

*Iriodin ® 223

Evaluation 3: All samples floated.

Evaluation 2: Some samples floated, were wetted and dispersed in the liquid.

Evaluation 1: all samples were wetted and dispersed in the liquid or sunk on the bottom without being dispersed.

2. Gravure printing test

A gravure ink with the following composition was prepared and a printing test of the gravure ink was conducted.

Ink composition:

Flaky pigment obtained in Example 1: 10 parts by weight
CCST ink medium (Toyo Ink Co., Ltd.): 20 parts by weight
Diluent (cyclohexanon): 20 parts by weight.

The ink composition described above was prepared and gravure-printed by means of a K printing proofer printing machine (R.K. Print-Coat Instruments Co., Ltd.).

Printing evaluation: The ink was printed on a black and white paper, and the flaky pigment in the ink was examined for the state of its arrangement on the surface of the print (orientation) as well as its coloration and gloss under the following 3 criteria by observation under an optical microscope.

TABLE 2

Results of print evaluation

| Sample | Orientation | Coloration | Gloss |
|---|---|---|---|
| Example 1 | 3 | 3 | 3 |
| Comparative Example 1 | 2 | 2 | 1 |
| Ir. 223* | 1 | 1 | 1 |

Evaluation 3: Significant effect
Evaluation 2: Moderate effect
Evaluation 1: Poor effect Hereinafter, various application examples where the flaky pigment of the present invention was incorporated are described.

Application Examples

1. Application example of a paint for automobiles
Composition A (acryl melamine resin):

| | |
|---|---|
| Acrydic 47-712 | 70 parts by weight |
| Super Deckamine G821-60 | 30 parts by weight |

Composition B:
Flaky pigment obtained in Examples 1 to 6
Composition C (thinner for acryl melamine resin):

| | |
|---|---|
| Ethyl acetate | 50 parts by weight |
| Toluene | 30 parts by weight |
| n-Butanol | 10 parts by weight |
| Solvesso #150 | 40 parts by weight |

100 parts by weight of composition A was mixed with 20 parts by weight of Composition B, and the mixture was diluted with composition C to adjust it to a viscosity (12 to 15 seconds in Ford Cup#4) suitable for spray coating and then spray-coated to form a base coat layer.

2. Application example for plastics

Composition (Plastic composition)

| | |
|---|---|
| High density polyethylene (pellet) | 100 parts by weight |
| Flaky pigment obtained in Example 1 to 6 | 1 part by weight |
| Magnesium stearate | 0.1 part by weight |
| Zinc stearate | 0.1 part by weight |

Pellets according to the compounding ratio described above were dry-blended and injection-molded.

3. Application example for cosmetics

Compact powder formulation

Composition:

| | |
|---|---|
| Flaky pigment obtained in Examples 1 to 6 | 25 parts by weight |
| Coloring pigment | 5 parts by weight |
| Lanolin | 3 parts by weight |
| Isopropyl myristate | suitable amount |
| Magnesium stearate | 2 parts by weight |
| Talc | 50 parts by weight |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A highly orientated flaky pigment being excellent in plane orientation, comprising a hydrated metal oxide and one or more phosphates selected from phosphates having perfluoroalkyl groups represented by the formulae (A) and (B) shown below or salts thereof, coated one after another on the surface of a flaky pigment with a pearl gloss;

(A) $(RfC_nH_{2n}O)_mPO(OM)_{3-m}$
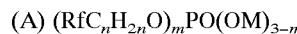
(B) $(RfSO_2NRC_nH_{2n}O)_mPO(OM)_{3-m}$
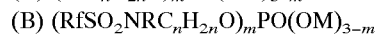

wherein Rf is the same or different and each is a linear or branched $C_3$ to $C_{21}$ perfluoroalkyl group or perfluoroxyalkyl group, n is 1 to 12, m is 1 to 3, M is hydrogen, an alkali metal, an ammonium group or a substituted ammonium group, and R is hydrogen or a $C_1$ to $C_3$ alkyl group.

2. The highly orientated flaky pigment according to claim 1, wherein the metal component in the hydrated metal oxide comprises one or more metals selected from aluminium, zinc, calcium, magnesium, zirconium and cerium, and the amount thereof in terms of metal oxide is 0.1 to 20% by weight relative to the flaky pearl pigment.

3. The highly orientated flaky pigment according to claim 1, wherein the amount of the phosphates having perfluoroalkyl groups represented by the formula (A) or (B) or salt thereof is 0.1 to 20% by weight relative to the flaky pearl pigment.

4. A highly orientated flaky pigment wherein the highly orientated flaky pigment according to claim 1 is surface-treated further with a polymer selected from cellulose compounds and poly(meth)acrylate compounds.

5. A process for producing a highly orientated flaky pigment according to claim 1, comprising, suspending a flaky pearl pigment in water adjusting, the pH of the suspension to no less than the neutralization hydrolysis point of a metal salt, then adding an aqueous solution of one or more metals salts selected from aluminium, zinc, calcium, magnesium, zirconium and cerium to the suspension while keeping its pH constant with an aqueous alkali solution, and after addition, adjusting its pH to no more than the pH at the neutralization hydrolysis point of the metals, adding an aqueous solution of phosphates having perfluoroalkyl groups represented by the formula (A) or (B) or salts thereof to the resulting suspension under stirring and, after addition, filtering, water washing and drying its suspension.

6. An ink, paint or plastic composition containing a highly orientated flaky pigment of claim 1.

* * * * *